(12) United States Patent
Cai

(10) Patent No.: US 7,281,467 B2
(45) Date of Patent: Oct. 16, 2007

(54) FLUID DELIVERY SYSTEM FOR GENERATING PRESSURIZED HOT WATER PULSES

(75) Inventor: Edward Z. Cai, Camas, WA (US)

(73) Assignee: Household Technology Group LLC, Camas, WA (US)

( * ) Notice: Subject to any disclaimer, the term of this patent is extended or adjusted under 35 U.S.C. 154(b) by 282 days.

(21) Appl. No.: 10/691,031

(22) Filed: Oct. 22, 2003

(65) Prior Publication Data

US 2005/0279215 A1    Dec. 22, 2005

(51) Int. Cl.
A47J 31/00    (2006.01)

(52) U.S. Cl. .................................. 99/293; 99/302 R

(58) Field of Classification Search ............... 99/293, 99/307, 302 R; 126/369, 373.1, 377.1, 379.1, 126/378.1, 381.1
See application file for complete search history.

(56) References Cited

U.S. PATENT DOCUMENTS

| | | | |
|---|---|---|---|
| 2,783,704 A | 3/1957 | Liebelt | |
| 3,405,630 A | 10/1968 | Weber, III | |
| 4,083,295 A | 4/1978 | Hollingsworth | |
| 4,158,330 A | 6/1979 | Vitous | |
| 4,287,817 A | 9/1981 | Moskowitz et al. | |
| 4,431,385 A | 2/1984 | O'Hare | |
| 4,457,217 A | 7/1984 | Ogawa | |
| 4,479,421 A | 10/1984 | Sanvitale | |
| 4,565,121 A | 1/1986 | Ohya et al. | |
| 4,634,838 A | 1/1987 | Berz | |
| 4,644,856 A | 2/1987 | Borgmann | |
| 4,660,466 A | 4/1987 | Fries et al. | |
| 4,741,260 A | 5/1988 | Boliver | |
| 4,760,774 A | 8/1988 | Lin | |
| 4,800,805 A | 1/1989 | Mahlich et al. | |
| 4,852,474 A | 8/1989 | Mahlich et al. | |
| 4,882,982 A | 11/1989 | Muttoni | |
| 4,882,983 A | 11/1989 | Pastrick | |
| 4,960,042 A | 10/1990 | Grossi | |
| 5,027,696 A | 7/1991 | Antonini | |
| 5,115,730 A | 5/1992 | Gockelmann | |
| 5,154,110 A | 10/1992 | Chang | |
| 5,200,221 A | 4/1993 | Knepler | |

(Continued)

Primary Examiner—Reginald L. Alexander

(57) ABSTRACT

Apparatus for generating and delivering a pressurized hot water pulse to a brewing station comprises a water inlet adapted to close during delivering the pulse, an outlet for the pulse, a generator comprising a water heating chamber for receiving a amount of water via the inlet and for heating the water therein to produce sufficiently hot water for the brewing station, a pressurization chamber for vaporizing water to generate pressurized steam to deliver the hot water as a pressurized hot water pulse to the brewing station through the outlet, and a heating system for the heating and the vaporization of the water in said pulse generator. The chamber has a first end adapted to receive pressurized steam and a second end close to the hot water intake port of the inlet. The pressurization chamber is adapted to provide pressurized steam to the first end of the heating chamber in such a manner that substantially no interaction occurs between the pressurized steam and the hot water between the first and second ends of the heating chamber, thereby substantially preventing the overheating of the hot water by the pressurized steam. The pulse generator is adapted to cause water to flow into the pressurization chamber from the water heating chamber or inlet for the generation of the pressurized steam.

56 Claims, 6 Drawing Sheets
(5 of 6 Drawing Sheet(s) Filed in Color)

FIG. 1

U.S. PATENT DOCUMENTS

| | | |
|---|---|---|
| 5,267,506 A | 12/1993 | Cai |
| 5,330,266 A | 7/1994 | Stubaus |
| 5,357,848 A | 10/1994 | Eugster et al. |
| 5,367,607 A | 11/1994 | Hufnagl et al. |
| 5,372,061 A * | 12/1994 | Albert et al. ............. 99/281 |
| 5,531,152 A | 7/1996 | Gardosi |
| 5,638,740 A | 6/1997 | Cai |
| 5,662,459 A | 9/1997 | Newby |
| 5,738,002 A | 4/1998 | Marano-Ducarne |
| 5,747,782 A | 5/1998 | Orrico et al. |
| 5,768,981 A | 6/1998 | Cicchetti |
| 5,769,135 A | 6/1998 | Mahlich |
| 5,800,707 A | 9/1998 | Mehnert |
| 5,862,740 A | 1/1999 | Grossi |
| 5,943,472 A | 8/1999 | Charles et al. |
| 5,992,298 A | 11/1999 | Illy et al. |
| 6,026,733 A | 2/2000 | Orrico et al. |
| 6,148,717 A | 11/2000 | Lassota |
| 6,261,447 B1 | 7/2001 | Van Herle et al. |
| 6,405,637 B1 | 6/2002 | Cai |
| 6,536,379 B1 | 3/2003 | Liu |

* cited by examiner

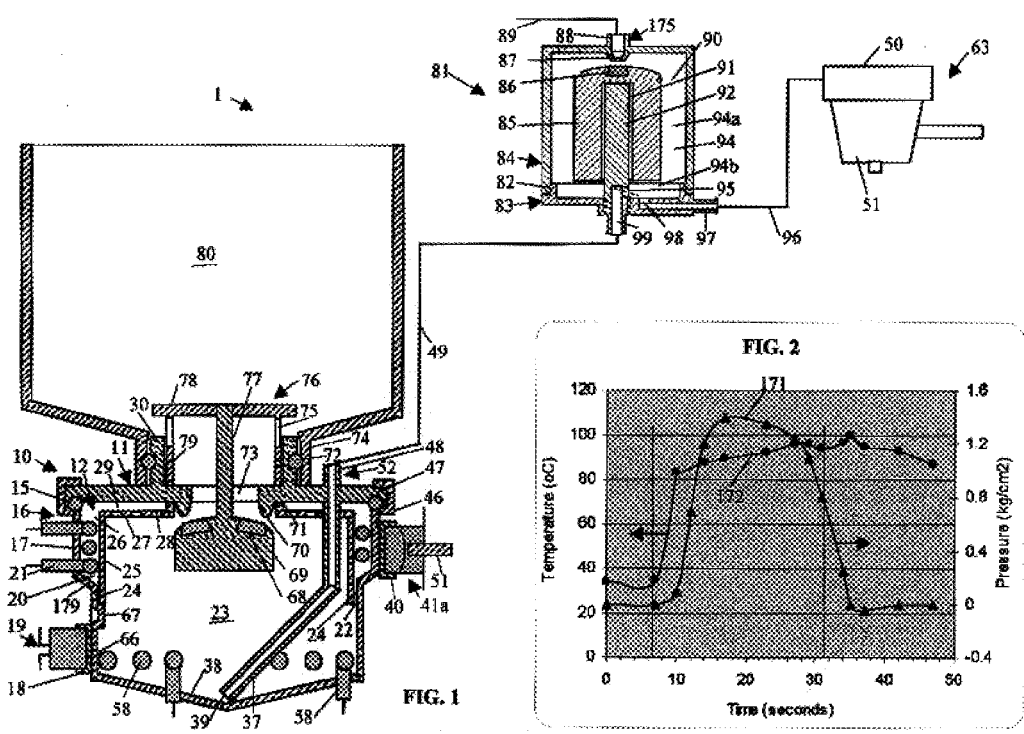

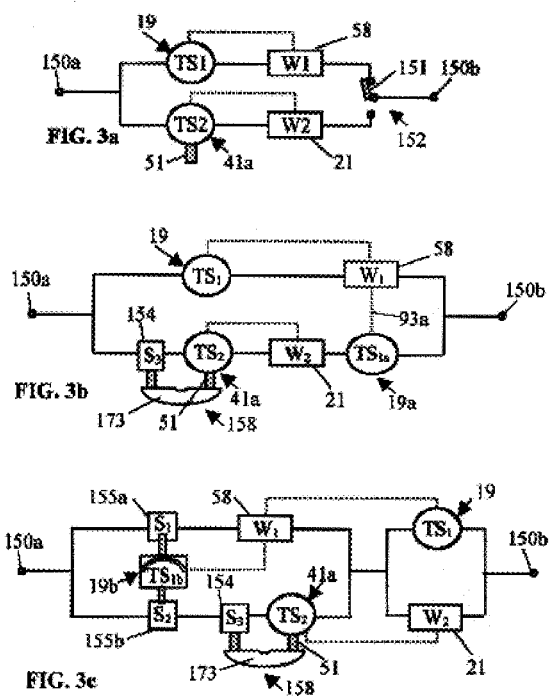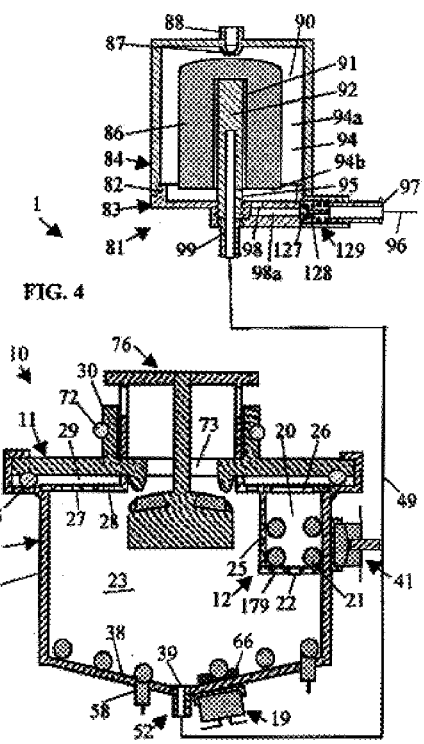

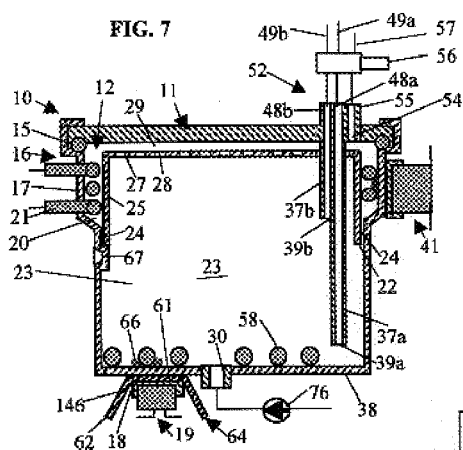
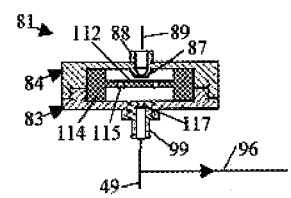
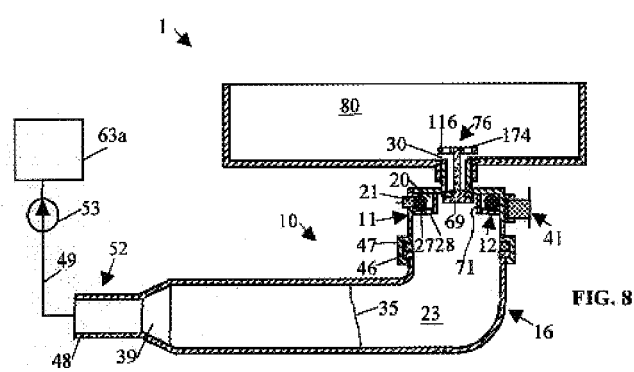
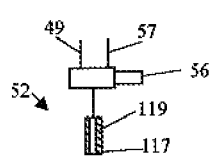

FLUID DELIVERY SYSTEM FOR GENERATING PRESSURIZED HOT WATER PULSES

FIELD OF THE INVENTION

The present invention relates to apparatus for generating pressurized water and steam pulses and delivering the pulses to a utilization station. More particularly, the invention relates to apparatus for generating pressurized hot water pulses to brew beverages such as coffee and espresso, and to improve the brewing time and the taste for the beverage.

BACKGROUND OF THE INVENTION

Extraction temperature and time are among the most critical considerations when brewing coffee. Automatic drip coffee makers (ADCs) brew better coffee than percolators by avoiding re-boiling coffee and reducing extraction time, thus preserving the aroma and reducing coffee bitterness. (The bitter, less soluble chemicals in the grounds require longer extraction time.) Shorter extraction time, however, normally causes incomplete extraction, which contributed to the weaker coffee made by single-cup ADCs and by displacement-type coffee makers (U.S. Pat. No. 5,200,221).

It is known that the best brewing temperature for coffee is 192° to 205° F. Such high temperature is easily achievable by boiling water in a percolator. But it is more difficult for ADCs, especially when a single cup of coffee is to be brewed, which also contributed to the weaker coffee made by single-cup ADCs.

In the applicant's earlier U.S. Pat. No. 5,267,506, apparatus is disclosed to brew coffee by extracting the grounds under elevated pressure to reduce the extraction time while achieving full flavor extraction. The apparatus has a cell in contact with a heater that draws an amount of water from a reservoir and subsequently heats the water and generates pressurized steam to deliver the hot water. In a first embodiment, the hot water in the cell is delivered to and through the flavor-containing materials under steam pressure and the steam is then released through a steam release valve. In a second embodiment, the hot water in the cell is first delivered and the steam is later delivered to the flavor-containing materials.

In the applicant's another earlier U.S. Pat. No. 6,405,637, apparatus and method are disclosed to brew coffee by generating and delivering a plurality of pressure pulses, each of which contains a pressurized hot water pulse and a pressurized steam pulse, to and through the flavor-containing materials to extract the useful compounds under the pressure of the pressure pulses.

Such apparatus have numerous advantages including higher brewing speed, less flavor loss and lower cost over known coffee makers and espresso machines. However, significant advancements can still be made with such apparatus to improve the taste and brewing time as well as the ease of use and cost of the apparatus.

SUMMARY OF THE INVENTION

In accordance with the present invention, there is provided a new apparatus for generating and delivering a pressurized hot water pulse to a brewing station. The apparatus comprises a water inlet adapted to close during delivering the pulse, an outlet for the pulse, a generator comprising a water heating chamber for receiving a amount of water via the inlet and for heating the water therein to produce sufficiently hot water for the brewing station, a pressurization chamber for vaporizing water to generate pressurized steam to deliver the hot water as a pressurized hot water pulse to the brewing station through the outlet, and a heating system for the heating and the vaporization of the water in said pulse generator. The chamber has a first end adapted to receive pressurized steam and a second end close to the hot water intake port of the inlet. The pressurization chamber is adapted to provide pressurized steam to the first end of the heating chamber in such a manner that substantially no interaction occurs between the pressurized steam and the hot water between the first and second ends of the heating chamber, thereby substantially preventing the overheating of the hot water by the pressurized steam. The pulse generator is adapted to cause water to flow into the pressurization chamber from the water heating chamber or inlet for the generation of the pressurized steam. The pressurization chamber is adapted to have such a small volume for receiving water that the heating system can heat this small volume of water to generate steam pressure in seconds, thereby enabling the pulse generator to start delivering the pressurized hot water pulse substantially instantly after the heating system starts supplying electric heat to the pressurization chamber.

In one embodiment of the invention, the apparatus further comprises a reservoir connected to the inlet for a supply of water and a filling valve for the inlet. The filling valve is adapted to allow the water in said reservoir to automatically fill said pulse generator when pressure therein falls below a predetermined pressure after the delivery of a pressurized hot water pulse, thereby rendering the generator ready for the generation of a next hot water pulse, and to prevent the reverse flow during the delivery of the pressurized hot water pulse.

In another embodiment of the invention, the apparatus further comprises a lid adapted to close and lock to the inlet to allow the buildup of steam pressure in the pulse generator and prevent the lid from being dislodged by the steam pressure.

In another embodiment of the invention, the apparatus further comprises a passageway adapted to allow the hot water in the heating chamber to flow into the pressurization chamber as the water in the pressurization chamber is evaporated and a steam outlet connecting the pressurization chamber to a steam utilization station, thereby enabling continuous supply of pressurized steam to the steam utilization station.

In another embodiment of the invention, the apparatus further comprises a water reservoir connected to the inlet, a filling valve for the inlet, a heating controller adapted to cause the heating system to heat the hot water in the water heating chamber when the water temperature therein falls below a first temperature and to prevent the heating system from further heating the hot water when the water temperature reaches a second temperature, thereby maintaining the hot water in the heating chamber between the first and second temperatures, and a pressure controller adapted to cause the heating system to produce pressurized steam in the pressurization chamber to deliver the hot water as the hot water pulse and to prevent the heating system from further heating the pressurization chamber when the chamber temperature reaches a third temperature. The third temperature is substantially above the first and second temperatures. The pulse generator and pressure controller are adapted to prevent the residual heat in the pulse generator from generating any significant steam pressure after the filling valve opens to cause the water from the reservoir to automatically fill the generator, thereby preventing the delivery of any premature water pulse of insufficient or lukewarm temperature to the brewing station and enabling the pulse generator to function as a metering device to meter one hot water pulse, whose water volume approximately equates the volume of the heating chamber, to the brewing station.

It is an object of the present invention to provide a very low cost apparatus for delivering a pressurized hot water pulse of optimum temperature to a brewing station to brew better tasting coffee, espresso or tea.

It is a further object of the present invention to provide a very low cost apparatus that can instantly provide a pressurized hot water pulse to a hot water utilization station.

It is a further object of the present invention to provide a very low cost apparatus for delivering a pressurized water pulse to a water utilization station by pressurized steam;

It is a further object of the present invention to provide a very low cost apparatus that can generate pressurized steam instantly.

These and other objectives and advantages of the present invention will become apparent from the following description of the preferred embodiments, taken together with the accompanying drawings.

DESCRIPTION OF THE DRAWING

The accompanying drawing illustrates diagramatically non-limitative embodiment of the invention, as follows:

The patent or application file contains at least one drawing executed in color. Copies of this patent or patent application publication with color drawing(s) will be provided by the Office upon request and payment of the necessary fee.

FIG. 1 is a partially sectional and partially perspective view of an apparatus for extracting flavor-containing materials using pressurized hot water pulse in accordance with the present invention;

FIG. 2 is a graph showing the profiles of temperature vs. time and pressure vs. time during the preparation of a cup of coffee by the apparatus of FIG. 1;

FIGS. 3a to 3c are alternative electrical diagrams for controlling the heating and pumping activities to achieve the profiles shown in FIG. 2 by the apparatus of FIG. 1;

FIG. 4 is a first modified version for the apparatus of FIG. 1;

FIG. 6a is an alternative pressure relieving valve for the apparatus of FIG. 6;

FIG. 7 is a third modified version for the apparatus of FIG. 1;

FIG. 7a shows an alternative outlet for the apparatus of FIG. 7;

FIG. 8 is a forth modified version for apparatus of FIG. 1 for generating pressurized water pulses for more general purposes;

DETAILED DESCRIPTION OF THE PREFERRED EMBODIMENTS

Figure 5A:
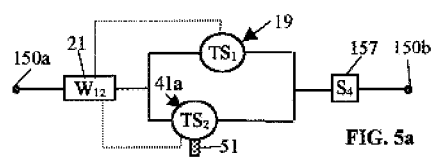
FIG. 5a is an electrical diagram to control the heating and pumping of the apparatus of FIG. 4.

FIG. 1 shows certain parts of an apparatus 1 for making beverages such as coffee, tea, espresso and latte, which embodies one form of the present invention. Only those parts of the apparatus are shown which are necessary for full understanding of the invention. Apparatus 1 comprises a pulse generator 10 connected to a cylindrical inlet 30 and an outlet 52, a water reservoir 80 having a cylindrical opening 72 sealed to inlet 30 with an o-ring 72, a pressure relief valve 81 connected to outlet 52 by a tube 49, and a brewing station 63 having a mounting head 50 connected to valve 81 by a conduit 96 and a brew basket 51 sealable to the mounting head.

The pulse generator 10 comprises an upper body 11, a lower body 16, a water heating chamber 23, a pressurization chamber 12, an electrical heating system including a water heating heater 58 and a pressure delivery heater 21, a water heating controller 19 having a temperature sensing member 18, and a pressure controller 41a having temperature sensing member 40 and an activation beam 51. The lower body has a side wall 17, a bottom 38 and a peripheral edge 46 bent over to clamp onto the peripheral edge 47 of the upper body to form a watertight seal with a gasket 15 between the peripheral edges 47 and 47. The lower body is connected to the cylindrical inlet 30 and has an opening 73 and a cylindrical lip 70 for receiving a filling valve 76 for inlet 30.

The filling valve has a valve member 69 and a seal gasket 68 to seal to lip 70 to prevent reverse flow from generator 10 to reservoir 80 during the delivery of a pressurized hot water pulse, and to open the lip and inlet 30 to allow automatic refilling of the generator by water from reservoir 80 after the delivery of the hot water pulse. The valve also has a retaining member 79 resting on the bottom of inlet 30, a plurality of openings 75 on member 79 for water to pass, a horizontal splash guard 78 to prevent the splashing caused by quick refilling of the generator when the water level in reservoir 80 is low, and a stem 77 to connect valve member 69 to the splash guard.

The filling valve 76 produces a special sound during the refilling of the generator 10. Both the sound level and quality can be tuned by adjusting the size and shape of the inlet 30, splash guard 78, openings 75 and the movable distance for valve member 69. It was also found that the refilling sound becomes significantly louder when the reservoir 80 is near empty, which louder sound may be used to indicate to the user that it is time to add water into or refill the reservoir.

The pressurization chamber 12 comprises an evaporation chamber 20 in which the delivery heater 21 is housed, a chamber bottom 179 and a top chamber opening 26. The water heating chamber 23 contains the vast majority or as high as 90% to 99% of the water in the pulse generator 10. The heating heater 58 is housed in the bottom end of the heating chamber, and a small section of the heater is welded to side wall 17 of the lower body by a metal material 66 to improve heat conduction to a temperature sensing plate 18 of heating controller 19. The heating controller causes heating heater 58 to heat the water in heating chamber 23 to maintain the hot water temperature between approximately 170° F. to 210° F., preferably between 180° F. to 200° F., before the pressure controller 41a allows the delivery heater 21 to generate steam pressure in pressurization chamber 12 to deliver the hot water as a pressurized hot water pulse to the brewing station 63. The controllers 19 and 41a will be discussed in detail in FIGS. 3a to 3c.

Since the pressurization chamber 12 may contain as low as 1% to 10% of the water in the pulse generator 10, the delivery heater 21 can heat such a small volume of water to above boiling point quickly to start generating pressurized steam in the evaporation chamber in seconds. As a result, the generator may start delivering the hot water in the heating chamber 23 as a pressurized hot water pulse to the brewing station 63 nearly instantly after the pressure controller 41a turns on the electricity to the delivery heater.

The pressurization chamber 12 and water heating chamber 23 are separated from each other by a cylindrical sleeve 25 supported at its bottom end by a plurality of protrusions 67 formed on the side wall 17 of lower body 16. A water passage 24 is formed between the very bottom part of the sleeve 25 and the side wall 17 and a plurality of slot openings 22 are formed between protrusions 67 at the bottom end of the passage 24. The water passage needs to be sufficiently more resistive to flow than the top chamber opening 26 to restrict or even prevent the pressurized steam generated in the evaporation chamber from entering the water heating chamber at slot openings 22.

To be resistant to scale formation due to hard water, the pressurization chamber 12 has a substantially larger volume than the volume of water it needs to contain to provide sufficient pressurized steam to deliver the hot water pulse. Only about 1% to 60% of the water in the pressurization chamber is intended to be evaporated into pressurized steam, and the other 40% to 99% of the water is intended as hot cleansing water to be forced out of the pressurization chamber through its top opening 26 and/or the passage 24 into heating chamber 23. As a result, the pressurization chamber is cleaned by the hot cleansing water every time when a pressurized hot water pulse is delivered. It is appreciated that to produce a temperature shock to loosen any scales formed on the surfaces in the pressurization chamber, the chamber opening 26/distribution openings 28 and/or the passage 24/slots 22 need to be sufficiently large to allow the cold water to quickly enter the pressurization chamber to cool the surface.

By having the pressurization chamber 12 near the top of the pulse generator, water may not enter the pressurization chamber through slots 22 and channel 24 until the heating chamber 23 is more than half full. First, this spatial arrangement minimizes the distance the pressurized steam has to travel to reach the top end of the heating chamber. Second, this arrangement prevents the residual heat in the pressurization chamber from producing enough steam pressure to deliver a premature water pulse or a baby pulse during the refilling of the generator, because there is already too much cold water in the generator for the residual heat to heat up when the cold water reaches the pressurization chamber. Third, this arrangement prevents the delivery of a hot water pulse if there is not enough water in the reservoir to fill the generator and to reach the pressurization chamber.

A distribution plate 27 having a plurality of openings 28 is connected to the top periphery of sleeve 25 and is positioned at the top end of the water heating chamber 23. A distribution chamber 29 is formed between the upper body 11 and the distribution plate for collecting pressurized steam. The height of the distribution chamber is defined by a short rim 71, approximately 1 to 4 mm in height, around the center opening of the distribution plate. The sleeve 25 guides all the pressurized steam generated in the evaporation chamber 20 through the top chamber opening 26, thereby preventing the pressurized steam from mixing with and heating the hot water in the water heating chamber.

The pressurized steam from the top chamber opening 26 enters distribution chamber 29 and subsequently reaches the top end of the water heating chamber 23 via the openings 28 on distribution plate 27, and subsequently becomes collected in the space above the surface of the hot water in the heating chamber 23. The distribution plate 28 helps forming a smooth interface between the hot water and the pressurized steam, thereby further preventing the pressurized steam from mixing with and heating the hot water in the water heating chamber. The pressurized steam at the top end of the water heating chamber drivers the hot water therein into a hot water intake port 39 of the outlet 52 near the bottom end of the heating chamber, and into a conduit 37 connected to the tube 49 at the hot water outlet port 48 of outlet 52.

The tube 49 carries the hot water to pressure relief valve 81. The valve has a lower body 83 having a valve inlet 99 connected to tube 49 and an outlet channel 97 connected to mounting head 50, a valve member 85 having a rubber disc 86, and an upper body 84 connected to the lower body by thread 82 to form a valve chamber 94 having a lower chamber 94b below the valve member and an upper chamber 94a. The upper body has a passageway 175 having an orifice 87 sealable by rubber disc 86 when hot water enters valve chamber 94 to float the valve member and an upper opening 88 connected to a tube 89 that leads to reservoir 80 or a water holding chamber (not shown) open to atmosphere. The valve member has a cylindrical cavity 91 to receive a rod 92 on lower body 83 to center disc 86 below orifice 87.

The gap 90 between valve member 85 and upper body 84 is critical to the release of pressure by passageway 175. When gap 90 is smaller than about 0.05 inches, it took as long as 15–30 seconds for valve member 85 to open orifice 87 after pressurized steam entered valve chamber 94. When the gap is larger than about 0.1 inches, it took only 4–8 seconds for the valve member to open orifice 87 after pressurized steam entered the valve chamber. (Note: The valve member 85 and orifice 87 were kept the same for both cases; the gap was increased by increasing the diameter of the upper and lower bodies 83 and 84.) A larger gap 90 also helps lowering the hot water temperature at the end of a hot water pulse. It was found that any space that can hold about 10% or more of the hot water in heating chamber 23 and allow the water to drain back into the heating chamber could help reducing the hot water temperature at the end of a hot water pulse.

A drainage opening 95 is located at the bottom of valve chamber 94 to allow any water that enters the valve chamber, conduit 96 and mounting head 50 during the periods of filling the heating chamber 23 and of heating the water in the heating chamber to drain back into the heating chamber. Such water outside the heating chamber is normally too cool to effectively extract the coffee grounds in brewing station. Therefore, drainage opening 95 insures that all the water delivered to the brewing station is sufficiently hot for extracting the coffee grounds. The drainage opening also functions as the hot water inlet port for valve chamber 94. A valve outlet port 98 is formed right next to drainage opening 95 to allow the hot water from heating chamber 23 to reach the outlet channel 97 instantly, thereby preventing the hot water from being cooled down by the relatively cold valve member 85 and the lower and upper bodies 83 and 84.

FIG. 2 shows a pulse pressure vs. time profile, marked by number 171, and a water temperature vs. time profile, marked by number 172, for one pressurized hot water pulse delivered to the brew station 63 to brew one 5-oz cup of coffee. Both the temperature and pressure were measured between the relief valve 81 and mounting head 50. Prior to time=second, hot water in heating chamber 23 was maintained at 82 to 94° C. by heating heater 58 and heating controller 19 having a thermostat that opens at about 85° C. and closes at 75° C. At time=0 seconds, the delivery heater 21 was turned on and it quickly heated the small amount of water in the pressurization chamber 12 to generate pressurized steam, which is guided by sleeve 25 to the distribution plate 25 and to the top end of the heating chamber 23 to deliver the hot water therein to the brewing station at time=7 seconds. At time=16 seconds, the steam pressure reached 1.4 kg/cm$^2$, which corresponds to a water temperature of 110° C. in the pressurization chamber, while the temperature of the hot water in the pressurized hot water pulse was merely 90° C. At time=31 seconds, the steam entered the relief valve 81 to cause the valve member 85 to open the orifice 87 to release the pressurized steam into atmosphere, which caused the pressure in the generator to drop quickly to a pressure at which the filling valve 76 opened to refill the generator at time=~35 seconds. This renders generator 10 ready to generate and deliver a next pressurized hot water pulse to brewing station 63 to brew a next 5-oz cup of coffee.

The temperature vs. time profile 172 of FIG. 2 shows that after the relief valve 81 opened at time=31 seconds, the measured temperature spiked to 100° C. at time=34 to 35 seconds. This temperature spike is believed to be caused by a little pressurized steam overshooting into tube 96 and even into brewing station 63. It is appreciated that by allowing sufficient steam to overshoot into brewing station, the coffee grounds or pod in basket 51 can be slightly dried by the steam for drip-free disposal. It is also appreciated that the valve member 85 may be adapted to open orifice 87 while there is still hot water in tube 96 to prevent any overshooting of the steam. It is also appreciated that the removal of sleeve 25 caused the temperature of the 1.5–2.5 oz of hot water in the later half of the pressurized hot water pulse to be significantly over 100° C., which resulted in over-extraction and some burned taste in the coffee.

FIGS. 3a to 3c show three exemplar electrical diagrams for connecting the delivery heater 21, heating heater 58, heating controller 19 and pressure controller 41a of FIG. 1. In these diagrams and in diagram 5a, the solid lines represent electrical connections, the dotted lines represent thermal conductive connections and the dots 150a and 150b represent the two electrical terminals adapted to plug into an AC electrical socket. The heating heater 58 and delivery heater 21 are either tubular, thin film or other electrical heaters which have wattage of about 30 to 1700 watts. Heaters of 800 to 1400 watts are used here for shorter heating and delivery time in brewing coffee.

In FIG. 3a, the pressure controller comprises a manual thermostat 41a that opens or turns off when the temperature its sensing member 40 senses reaches $T_3$, or 110° C. in one exemplar embodiment of FIG. 1, and will stay off until the activation beam 51 is pressed and an electrical switch 152 having one blade 151 that is adapted to ensure that only one of the heating heater and delivery heater can be on at a time. Here, the heating controller is an automatic thermostat 19 that opens when its sensed temperature reaches $T_2$ of 94° C. and closes or turns on when its sensed temperature falls below $T_1$ of 82° C. This means that the hot water temperature may vary from 82 to 94° C., with a differential temperature $\Box T$ (=$T_2-T_1$) of 12° C., when the switch 152 connects the heating heater 58 to power. For a tighter $\Box T$ of 1 to 4° C., expensive electronic temperature controller may be used.

It was found that to prevent the generator from delivering a unwanted premature or baby pulse to the brewing station during the refilling of the generator, $T_3$ needs to be low enough to allow the thermostat 41a to open about 1 to 15 seconds, depending on the heat capacity of the generator, before all hot water in the heating chamber is delivered. It is appreciated that the switch 152 may be coupled to the manual thermostat 41a in such a way that the action of turning blade 151 toward the delivery heater circuit also presses the activation the beam 51. It is also appreciated that if both heaters were on during the delivery of the hot water pulse, the hot water in the later part of the pulse would be very much overheated and cause a burned coffee taste; if both heaters were on during the heating of the cold water in the heating chamber 23, the delivery heater would deliver a lukewarm water pulse to the brewing station.

In FIG. 3b, the pressure controller comprises a combo switch 158 and a close-on-rise thermostat 19a. The combo switch 158 comprises a switch 154 having a button 173 coupled to the activation beam 51 of the manual thermostat 41a in such a way that the action of pressing button 173 to turn on switch 154 will cause the thermostat 41a to move to its 'on' position. The close-on-rise thermostat 19a is adapted to disallow the combo switch 158 to turn on the delivery heater 21 when the water in the heating chamber is below approximately $T_1$, and to allow combo switch 158 to turn on the delivery heater when the hot water rises to $T_1$, thereby preventing the delivery of a pressurized hot water pulse until the hot water reaches $T_1$.

In FIG. 3c, the pressure controller comprises the combo switch 158 and a dual-switch thermostat 19b. The dual-switch thermostat 19b controls a first switch 155a, which is serially connected to the heating heater 58, and a second switch 155b, which is serially connected to the combo switch 158, in such a way that only one of the switches 155a and 155b can be at a time. (Note: A normal thermostat controls only one switch to turn it on or off.) In operation, when the temperature sensed by the dual-switch thermostat 19b and by the automatic thermostat 19 reaches $T_2$, the dual-switch thermostat 19b turns off switch 155a and turns on switch 155b and the thermostat 19 opens, which allows the combo switch 158 to turn on the delivery heater 21. Such status of the switch 155a, switch 155b and thermostat 19 stays the same before the sensed temperature reaches $T_1$. After the sensed temperature reaches $T_1$, the dual-switch thermostat 19b turns on switch 155a and turns off switch 155b and the thermostat 19 closes, which automatically turns on the heating heater 58 and disallows the delivery heater 21 to be turned on by the combo switch 158.

In the apparatus 1 of FIGS. 1, 4–7 and 9, the brew basket 51 may be adapted to contain loose coffee grounds, beverage pods, or both. The mounting head 63 may be adapted to receive a beverage cartridge having a hot water inlet that can seal to the mounting head. The brewing station may be replaced by other hot water utilization stations such as a tea brewing station, a hot water shower, a hot water dispenser or a hot water cleaning station to produce a hot water jet for cleaning objects such as dishes and carpet.

It is appreciated that in the description and claims, the term water is used to represent any liquid that can evaporate to generate pressurized steam or vapor. Such liquid may be city water, drink water, sea water, liquid medicines, liquid chemicals, or any alcoholic or non-alcoholic beverages. The reservoir 80 may be fixed or removable, and can be a water tank, a water containing chamber, a water bottle, a pond, a river or any container that can contain a supply of water.

FIG. 4 shows a first modified version of the apparatus 1 of FIG. 1, not showing the reservoir 80 and the brewing station 63. In the apparatus 1 of FIG. 4, the pressurization chamber 12 is formed inside the heating chamber and comprises a side wall sealed at its right side to the side wall 17 of the lower body 16 and connected at its top end to the distribution plate 27, a bottom plate 179 connected to the lower end of the side wall 25, a bottom opening 22 formed at the bottom pate 179, an evaporation chamber 20 and a top chamber opening 26 for directing the pressurized steam into the distribution chamber 29. The delivery heater 21 is housed in the evaporation chamber.

The automatic thermostat 19 is moved to the lowest region of the bottom 38 of the heating chamber. It was found that by moving the thermostat 19 to this new position, the temperature variation □T for the hot water in the heating chamber decreases from about 12° C. in FIG. 1 to about 8° C. here. Although the causes for this tighter □T is not understood, the inventor did notice that the heating heater was turned on and off more frequently in the apparatus of FIG. 4 than in that of FIG. 1.

An overshoot prevention valve 129 is in the channel 98a between the outlet port and 98 and the outlet channel 97 of the relief valve 81. The prevention valve has a seal disc 127 for sealing channel 98a and a spring 128 for exerting a force to the seal disc to stop flow into the conduit 96 and brewing station until the pressure of the hot water pulse reaches a predetermined value.

Figure 5:
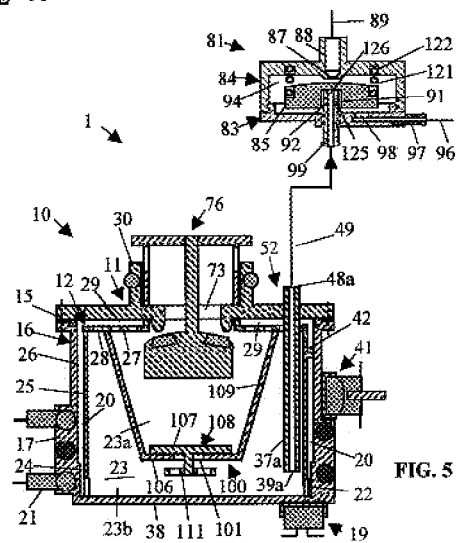
FIG. 5 is a second modified version for the apparatus of FIG. 1.

FIG. 5 shows a second modified version of the apparatus 1 of FIG. 1, also not showing the reservoir 80 and the brewing station 63. In the apparatus 1 of FIG. 5, the delivery heater 21 is cast into the side wall 17 of the lower body near bottom 38, and it functions also as the heating heater for the water in the heating chamber 23. The sleeve 25 has several spacers 42 to ensure uniform gap between the sleeve and the side wall 17 and a plurality of openings 22 and is supported by the bottom 38. The heating chamber 23 is divided into an inner chamber 23a and an outer chamber 23b by a flow modulator 100 for modulating the flow path of the hot water in the heating chamber during the delivery of the hot water pulse. The flow modulator has a tapered side wall 109 connected to the distribution plate 27 at its top end and to a modulator plate 106 at its lower end, a modulator opening 101 in the modulator plate and float valve 108 having a float disc 107 that floats to open the modulator opening when there is water in the inner chamber 23a and sinks to closes the modulator opening when the inner chamber is empty. The float disc is kept in place by a retainer 111. By distributing more pressurized steam into the inner chamber 23a first, the hot water therein will be first delivered through the outlet 52 before the hot water in the outer chamber is.

It was found that the hot water outlet port 39a may be positioned substantially above the bottom 38 to allow some hot left undelivered in the heating chamber. It was also discovered that when the outlet port 3a is located about 0.3 to 0.6 inches from the bottom 38, the temperature of the hot water in the early phase of the pressurized hot water pulse was substantially increased, sometimes by more than 4 degrees, and was substantially decreased, sometimes by more than 3 degrees, in the late phase of the hot water pulse.

FIG. 5a shows an electric diagram for connecting the delivery heater 21, heating controller 19 and pressure controller 41a and a power switch 157. The operations of these components are similar that those described in FIGS. 3a to 3c, and will not be repeated here.

The pressure relief valve 81 further comprises a loaded spring 121 having one end attached to the top wall of the valve chamber 94 and the other end pressed onto the valve member 85 to increase the effective weight of the valve member, thereby enabling the valve member 85 to move away from or open the orifice 87 even when the valve chamber is filled with hot water and the pressure is still substantially. A through-opening 126 is formed on the rod 92 to produce a water jet to push the valve member towards the orifice at the early phase of the pressurized hot water pulse. A plurality of small orifices 125 are formed on the rod to allow effective relief of the pressure in the generator after the valve member opens the orifice 87. It is appreciated that with the spring 121, the valve member can be made small and even miniaturized to make the relief valve compact and space-saving and still be able to open at pressure as high as one to four bars. It is appreciated that heavy materials such as stainless steel and ceramics that are much heavier than water may be used here in pace of the spring-loaded valve member.

Figure 6:
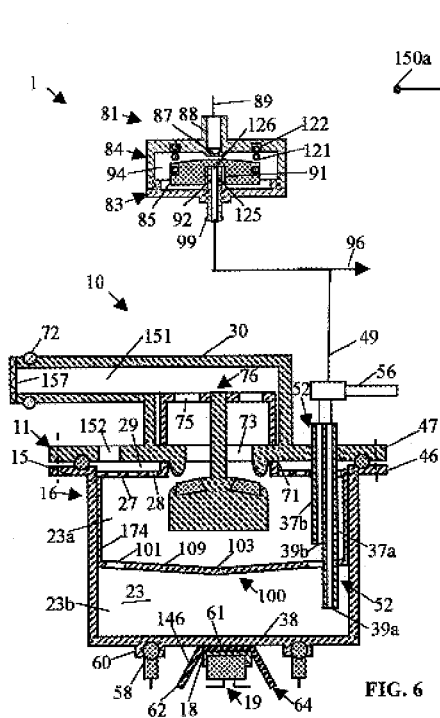
FIG. 6 is a partially sectional and partially perspective view of an alternative apparatus for extracting flavor-containing materials in accordance with the present invention.

In FIG. 6, an alternative apparatus 1 for extracting flavor-containing materials in accordance with the present invention is presented, also not showing the reservoir 80 and the brewing station 63. The apparatus here has a steam generator (not shown) that is separated from the pulse generator 10. The pulse generator has a steam inlet 152 for introducing the steam into the distribution chamber 29 to deliver the hot water produced in the heating chamber 23 as a pressurized hot water pulse to the brewing station. Unlike the inlet 30 of the apparatus of FIG. 1, the inlet 30 has a thin or narrow horizontal channel 151, and filter 157 at the inlet opening of the thin channel, and o-ring 72 for sealing to a water reservoir. It was found that with the thin horizontal channel, the cold water remains cold even after the heating controller 19 has kept the hot water in heating chamber between 180 to 190° F. for hours. In addition, the channel 151 reduces the energy use when the heating chamber keeps the water in it hot. It is believed that thin horizontal channel prevents the mixing of the hot water in the heating chamber 23 and the cold water in the reservoir 80.

The heating chamber 23 of FIG. 6 has a flow modulator, similar to that of FIG. 5, for dividing the chamber into an upper chamber and lower chamber for modulating the hot water flow therein. The modulator has a partition plate 109 connected to the distribution plate 27 by its side wall 174, a plurality of modulator openings 101 located near the peripheral of the partition plate, and a recessed center 103 for the partition plate. The modulator causes the water near the edge part of the upper chamber 23a to be delivered into the lower chamber 23b before the water near its center. The recessed center 103 helps keeping the water at the steam/water interface, which may be overheated, above the partition plate and prevents its delivery.

A Delta temperature narrower 64 is connected to the temperature sensing member 18 of the heating controller 19 for providing a smaller □T so that the hot water pulse delivered to the brewing station has a more consistent temperature. The Delta temperature narrower 64 has a contact plate 61 in heating conducting relation to the temperature sensing member 18, a cooling end 62 located sufficiently away from the heating chamber for absorbing coldness from air or a cool object, and a conducting arm 146 for conducting the coldness to the contact plate 61 which in turn conduct the coldness to the sensing member 18. The sensing member 18 then instructs the heating controller 19 to turn on the heating heater 58 in a cavity 60 on the bottom 38, even though the temperature of the hot water in the heating chamber is probably still significantly above $T_1$ As a result, the Delta temperature narrower increased $T_1$ to a significantly higher value and reduced □T. Meanwhile, by making the heat conduction rate from the heating heater 58 to the sensing member 18 sufficiently higher than that from the cooling end 62 to the sensing member, the heating controller can still turn off the heating heater 58 at about $T_2$. By using highly conductive materials such as copper for the arm 146 and by connecting the cooling end to a cool surface, the □T could been reduced from 12 to 16° C. for normal thermostats to as low as 3 to 7° C., which is as narrow as the □T an expensive electronic temperature controller can provide. (Note: An electronic temperature controller costs about $10 each compared to about $0.5 each for thermostats.)

Unlike the earlier embodiments of FIGS. 1, 4 and 5, the outlet 52 here can meter either a pressurized hot water pulse containing either 1 cup or 2 cups of hot water to brew 1 or 2 cups of coffee at the brew station. The outlet comprising a first hot water intake port 39b located at a the middle of the heating chamber 23, a second hot water intake port 39a located near the bottom 38 of the heating chamber, and a selection valve 56 for a user to chose to connect one of the first and second intake ports to the conduit 49 leading to the brewing station. A first and a second tube 37b and 37a connect the first and second intake ports 39b and 39a, respectively, to the selection valve 56. In operation, when a user moves the selection valve 56 to connect the first hot water intake port 39a to the brewing station 63, the hot water between the filling valve 76 and the first intake port 39b in the heating chamber 23 will be delivered as an undersized hot water pulse, containing one cup of hot water, to the brewing station; when the user moves the selection valve to connect the second intake port 39a to the brewing station, the hot water between the filling valve and the second intake port 39a in the heating chamber will be delivered as a full-sized hot water pulse, containing two cups of hot water, to the brewing station 63 for two cups of coffee (or for one extra large or grand sized cup of coffee).

The pressure relief valve 81 here is similar to the relief valve of FIG. 5 except that it does not have an outlet channel 97 and outlet port 98. The tube 96 is connected directly to the conduit 49 below the inlet 99 of the relief valve to conduct the hot water to the brewing station. In operation, when the pressure of the pressurized hot water pulse from the conduit 49 and inlet 99 becomes high enough, it produces a sufficiently high speed water jet at opening 117 and/or sufficiently high pressure drop in the space between the rod 91 and cylindrical hole 92 to push the spring 121-loaded valve member 85 to close the orifice 87 to direct all hot water the brewing station; when the pressure lowers to a predetermined value the valve will move away from the orifice 87 to release the residual pressure in the pulse generator. It is appreciated that the inlet 99 of pressure relief valve 81 in this all other embodiments may be connected either directly or by a separate conduit to the pulse generator 10, rather than be located in the passageway between the outlet 52 and the brewing station 63.

FIG. 6a shows a pressure relief valve 81 in which an elastic membrane 112 connected around its periphery to a cylindrical support sleeve 114 replaces the valve member 85 of the relief valve of FIG. 6. A plurality of openings 115 are formed in the membrane to allow hot water and steam to pass through. The valve inlet 99 has a jet orifice 117 adapted to produce a high speed water jet to push the membrane 112 to seal the orifice 87 when hot water is introduced into the relief valve. The jet orifice 117 is located sufficiently away from the membrane 112 so that a steam jet will lose its momentum when it reaches the membrane and would not be able to cause the membrane to seal the orifice. The openings 115 may be made sufficiently restrictive to produce enough differential pressure across membrane 112 when hot water passes through, thereby bending the membrane to close the orifice 87.

FIG. 7 shows a third modified version of the apparatus 1 of FIG. 1, not showing the reservoir 80 and the brewing station 63 and the pressure relief valve 81 since they are similar or identical to those of FIGS. 1 or other earlier embodiments. Here the water inlet 30 is located at the bottom 38 of the lower body 16 and a check valve 76 is connected to the inlet to prevent reverse flow. The inlet 30 may receive water from a reservoir or a plumb system. A pump (not shown) may be placed between the reservoir and the inlet 30 to deliver water to or even through the pulse generator 10 so that the pulse generator can be located above the reservoir 80. Like the apparatus 1 of FIG. 6, the outlet 52 has a first and a second hot water intake port 39b and 39a for allowing the pulse generator to deliver a pressurized hot water pulse containing either one or two cups of hot water. In addition, the outlet 52 comprises a steam outlet port 54 connected to the pressurization chamber 12, a tube 55 connecting the steam port to selection valve 56 and a steam tube 57 for delivering steam to a steam utilization deice such as a milk frothier or steam heating device (not shown).

In FIG. 7a, an alternative outlet 52a is provided to replace the outlet 52 of FIG. 7. The outlet 7a has an intake port 117 connected to the upper body 11 for both the pressurized steam and hot water, a tube 119 to connect the outlet port 117 to selection valve 56 to direct the steam to a steam utilization station such as a milk frothier for espresso drinks via conduit 57 and the hot water to a hot water utilization station via conduit 49. To deliver the hot water to a brewing station for coffee or espresso, one moves the selection valve 56 to the hot water and turns on a pump (not shown) connected to inlet 30 to deliver cold water into heating chamber 23 to displace the hot water and force the lighter hot water upwards through the intake port 117 and conduit 49 to the brewing station. To deliver steam to the milk frothier, one moves the selection valve 56 to steam to cause the delivery heater 21 to evaporate the water in evaporation chamber 20 to generate steam, which is forced into the steam intake port 54 and delivered to the milk frothier by the steam pressure. The hot water in heating chamber 23 flows and feeds into the evaporation chamber as a result of gravity and the steam pressure above the hot water from the distribution plate 27 as the water is evaporated. Unlike the boilers in the current pump-boiler type espresso machines, the evaporation chamber contains only a very small amount of hot water and can be heated to boiling essentially instantly by the delivery heater, thereby enabling instant steam delivery to the milk frothier as well as instant recovery to hot water delivery after completing the milk frothing. It is appreciated that the intake port 117 may have a hot water intake port and a steam intake port separated from each other similar to that shown in the outlet 52 of FIG. 7.

FIG. 8 shows a forth modified version of the apparatus 1 of FIG. 1. The pulse generator 10 of FIG. 8 does not have a heating heater and heating controller, and is intended to deliver a pressurized cold water pulses to a water utilization station 63a. The pressurization chamber 12 is a thin chamber between the top wall of the upper body 11 and the distribution plate 27, and is located right above the top end of water chamber 23 to allow the distribution openings 28 to distribute the pressurized steam generated in the pressurization chamber into the top end of the water chamber. The delivery heater 21 is a tubular electric heater sandwiched between the upper body 11 and distribution plate 27. The pressure controller 41 may be a low cost thermostat that opens to turn off the delivery heater when the sensed temperature reaches about 100 to about 140° C., depending on the delivery pressure desired. A vertical rim or water shield 71 is located between the valve member 69 and delivery heater 21 to prevent the cold water from contacting the delivery heater 21 as the cold water enters the water chamber 23 from reservoir 80 during the refilling of the water chamber after the delivery a pressurized water pulse. The valve member 69 is kept in place by a plate 116 having openings 174. As a result, the shield 71 keeps the delivery heater hot until the cold water fills water chamber 23 and rises into the evaporation chamber 20, thus saving heating energy and reducing the time required to heat the water in the evaporation chamber to above boiling temperature.

The water chamber 23 has a generally tubular shape. At least the bent and horizontal part of the tubular water chamber should have a sufficiently small diameter so that the steam/water interface 35 remains intact as the pressurized steam on the right pushes the cold water on the left side of the interface towards the outlet 52. It is appreciated that a partition member (not shown) may be placed in the water chamber 23 along the water flow direction to divide the water chamber into a plurality of thinner water chambers to keep the steam/water interface 35 intact during the water delivery by the pressurized steam. It is also appreciated that an elongated heater and a heating controller (not shown) may by connected along tubular water chamber 23 to heat the water to a predetermined temperature if hot or warm water is needed at station 63a. It is also appreciated that tubular water chamber 23 may adopt any other shape such as a circular or coil shape. It is further appreciated that pressurization chamber 12 may be controlled to produce a small amount of pressurized steam that is enough to deliver only part of the water in water chamber 23 as a pressurized water pulse to water utilization station 63a.

A filling assisting valve 53 such as a directional valve or a simple flow restrictor is located between the outlet 52 and water utilization station 63a. The valve 53 prevents air to enter the water chamber 23 after the filing valve 76 opened to let cold water in the reservoir into the pulse generator if the utilization station is not restrictive to air flow. Without valve 53, the vacuum that is formed in water chamber 23 as the cold water causes the steam therein to condense may suck air into the chamber through the outlet 52 and thus cause incomplete refilling of the water chamber. The water utilization station 63a can be a decoration station such as a water fall, a water fountain, a water volcano, a water column, a cleaning device such as a dental device, a dish washing device, a floor cleaning device and a cloth washing device, a water storage or drainage area, a piece of land to be irrigated, a water-driven wheel or turbine, a water jet massager or any water station that can receive or use water.

It is appreciated that by positioning the delivery heater 21 next to valve member 69 of the filling valve and at the top end of the water chamber 23, the pulse generator 10 can still deliver pressurized water pulses to the utilization station 6a even if the distribution plate 27 and shield 71 are removed. However, without the distribution plate and shield, it takes the delivery heater 21 significantly longer to generate enough pressurized steam to start delivering the water in the water chamber and there is a lot of hot water at the end of each pressurized water pulse. It is also appreciated that in this and other embodiments the delivery heater 21 can be an electric heater, a gas-, oil- or coal-burning heater or even a nuclear heater, and that the delivery heater can be built into the pulse generator or be removable from the pulse generator like a stove. It is also appreciated that a plurality of pulse generators 10 may be connected together to deliver an essentially continuous water flow to the utilization station 6a. It is further appreciated that because the pulse generator 10 of FIG. 8 does not require any high-speed moving parts and electric motor, it can be manufactured at very small fraction of the cost of the current electric pumps.

Figure 9:
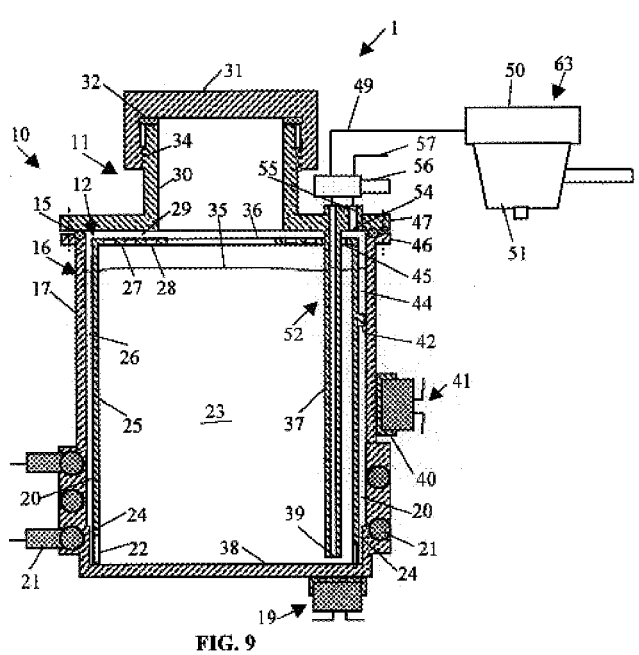
FIG. 9 is a fifth modified version for the apparatus of FIG. 1.

FIG. 9 shows a fifth modified version of the apparatus 1 of FIG. 1. The apparatus 1 of FIG. 9 is similar to that of FIG. 5 except their differences in the inlet 30, outlet 52, pressure controller 41 and flow modulator 100. In this embodiment, the pulse generator does not have a flow modulator. The inlet 30 is intended for the user to manually pour water into the water heating chamber 23. The inlet 30 has a thread 34 to engage with the thread on a removable or re-closable lid 31 to lock the lid to the inlet to prevent the pressurized steam from dislodging the lid during the delivery of the pressurized hot water pulse. A seal gasket 32 is attached to the removable or re-closable lid 31 to form a watertight seal to the inlet 30. The outlet 52 comprises a hot water intake port 39 connected to selection valve 56 by conduit 37, a steam intake port 54 connected to the selection valve by a channel 55, a conduit 49 for leading the hot water to brewing station 63, and a conduit 57 for leading the steam to a steam utilization station such as a milk frothier. The pressure controller 41 here is an automatic reset thermostat that opens to turn off the power to delivery heater 21 when the sensed temperature reaches 115° C. and closes when the sensed temperature lows to 115° C. To achieve lower or higher delivery pressure for the hot water in the water heating chamber 23, a thermostat with a lower or higher temperature set point may be used.

Unlike existing boiler-type steam espresso machine which brews coffee with a burned taste since all the water in the boiler is heated to far above 100° C. to produce pressure to deliver the overheated water to the coffee grounds, the apparatus 1 according to the invention brews a cup of coffee with well-balanced taste and thick body because the pressurization chamber 12 delivers the hot water in the water heating chamber 23 at optimized temperature (about 89 to 97° C.) to the brewing station. It was found that when the temperature of the hot water in the heating chamber 23 is above 90° C., the steam from the pressurization chamber did not heat the hot water to any significant degree during the short period of time when the hot water is delivered through the coffee grounds in the brewing station.

Figure 10:
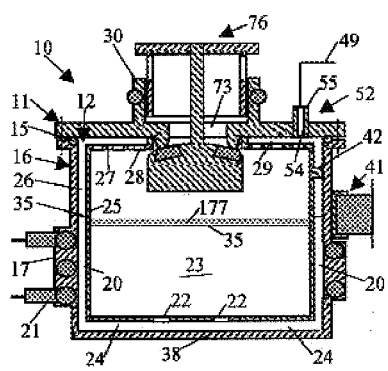
FIG. 10 is a sixth modified version for the apparatus of FIG. 1 for generating pressurized steam.

FIG. 10 shows a sixth modified version of the apparatus 1 of FIG. 1, not showing the reservoir 80 that is connected to the inlet 30. The apparatus 1 of FIG. 10 is intended to produce pressurized steam rather than pressurized hot water pulse, but it is mostly similar to that of FIG. 5 except their differences in the outlet 52, pressure controller 41, sleeve 25, heating controller and flow modulator. In this embodiment, the (steam) generator has neither a flow modulator nor a heating controller. The outlet 52 comprises a steam intake port 54, a steam channel 55 and a conduit 57 leading to a steam utilization station (not shown). The pressure controller 41 here is an automatic reset thermostat that opens to turn off the power to delivery heater 21 when the sensed temperature reaches 125° C. and closes when the sensed temperature lows to 115° C. To achieve lower or higher steam pressure, a thermostat with a lower or higher temperature set point may be used. The delivery heater 21 and the evaporation chamber 20 are located further above the bottom 38 and the sleeve 25 is made from heat-insulating material to prevent the water in water chamber 23 from being heated when steam is being generated in the pressurization chamber 12, thus maintaining the water in chamber 23 always cold to increase the safety of the generator.

The sleeve 25 has a horizontal plate 25a above the bottom 38 to form water channel 24 for leading the water that enters the water channel via a plurality of water inlet openings 22 on the horizontal plate into the evaporation chamber 20. A liquid film 177 that is not soluble in water, is lighter than water and has low vapor pressure below 100° C. is formed on the water surface 35 to prevent the steam from heating the water below. By minimizing the volume of water in the pressurization chamber 12, the steam generator can start generating steam in the pressurization chamber almost instantly after the electricity to the deliver heater 21 is turned on.

It is appreciated that the filling valve 76 and reservoir 80 may be removed from the apparatus, and the inlet 30 may be modified to be sealed by a lid 31 of FIG. 9. It is also appreciated that the outlet 52 and the filling valve 76 may be removed from the apparatus to allow the inlet 30 to function also as the steam outlet for the steam generated in the pressurization chamber 12. The inlet 30 may be made longer and outwardly tapered to have a larger top end, thereby reducing the steam speed as the steam flow reaches top end of the inlet 30 to contact a person's hands or face. It is further appreciate that the delivery heater 21 may be replaced by a stove which heats the bottom 38 to generate steam in the channel 24. To facilitate the steam flow towards the outlet opening 26 of the pressurization chamber, the horizontal plate 25a of the sleeve may be a little recessed in its center and the inlet opening should be sufficiently more restrictive.

Figure 11:
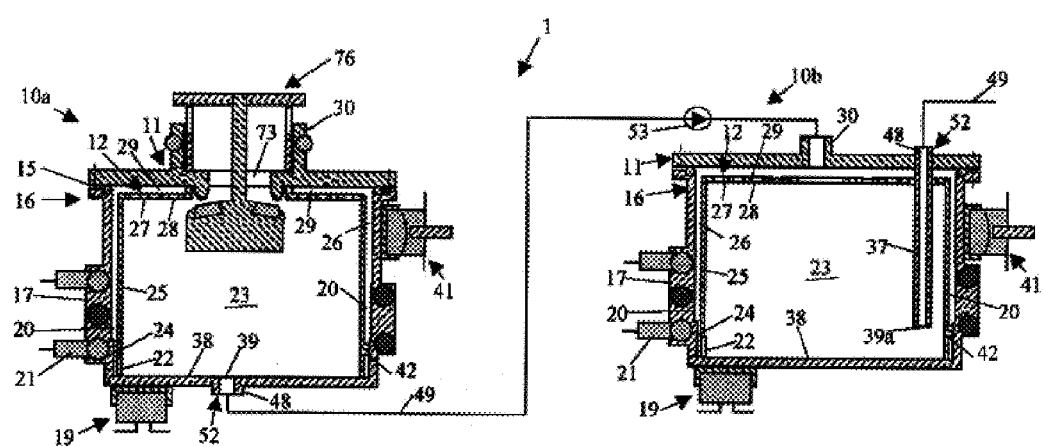
FIG. 11 is a partially sectional and partially perspective view of an apparatus comprising two modified apparatus of FIG. 1 to deliver either undersized or a full-sized pressurized hot water pulse.

FIG. 11 shows an apparatus comprising two modified apparatus of FIG. 1 to deliver either undersized or a full-sized pressurized hot water pulse, not showing the reservoir 80 that is connected to the inlet 30 of pulse generator 10a and not showing the pressure relief valve 81 and brewing station 63. The generators 10a and 10b are mostly similar to that of FIG. 5 except their differences in the outlet 52, inlet 30 and flow modulator. Neither generators 10a and 10b has a flow modulator. The outlet 52 of the generator 10a is connected to a check valve 53 and then to the inlet 30 of a second pulse generator 10b, making the generators 10a and 10b connected serially.

To deliver an undersized pressurized hot water pulse, one turns on the electricity to the delivery heater 21 of the pulse generator 10b to produce in the pressurization chamber 12 pressurized steam, which is subsequently delivered to the top end of heating chamber 23 by the distribution plate 27 to deliver the hot water in the heating chamber, which is maintained at about 85 to 95° C. by the heating controller 19, into the hot water intake port 29a and to the brewing station. To deliver a full-sized pressurized hot water pulse, one turns on the electricity to the delivery heater 21 of the pulse generator 10a to produce in the pressurization chamber 12 pressurized steam, which is subsequently delivered to the top end of heating chamber 23 to deliver the hot water therein to the inlet 30 of the generator 10b. The hot water delivered into the generator 10b forces the hot water already in the generator into the hot water intake port 39a and to the brewing station. After the generator 10a becomes empty, the pressurized steam enters the inlet 30 of the generator 10b and continues to force the hot water into the intake port 39a and to the brewing station until the generator 10b becomes empty. The steam pressure is then released by the pressure relief valve 81 and the filling valve 76 opens to cause both the generators 10a and 10b to be refilled by the cold water from the reservoir 80.

The scope of the invention is obviously not restricted to the embodiments described by way of examples and depicted in the drawings, there being numerous changes, modifications, additions, and applications thereof imaginable within the purview of the claims.

What is claimed is:

1. An apparatus for generating a pressurized hot water pulse and delivering it to a hot water utilization station comprising:
   an inlet for water, said inlet being adapted to be closed during the delivery of the pressurized hot water pulse;
   an outlet having a hot water intake port and a hot water conduit for directing the pressurized hot water pulse to the hot water utilization station;
   a pulse generator connected to said inlet and outlet, said pulse generator comprising a water heating chamber for receiving an amount of water via said inlet and for heating the water therein to produce sufficiently hot water for the hot water utilization station, a pressurization chamber for vaporizing water to generate pressurized steam to deliver under pressure said hot water in said heating chamber as the pressurized hot water pulse to the utilization station through said outlet, and a heating system for the heating and the vaporization of the water in said pulse generator, said heating chamber having a first end adapted to receive pressurized steam and a second end;
   wherein said pressurization chamber provides pressurized steam to said first end of said heating chamber;
   wherein said pulse generator is adapted to allow water to flow into said pressurization chamber from at least one of said water heating chamber and said inlet for the generation of the pressurized steam in said pressurization chamber by said heating system;
   wherein said pulse generator further comprises a partition for dividing said generator into said pressurization chamber and said water heating chamber; and
   wherein said pressurization chamber is formed between said partition and the side wall of said pulse generator, and comprises an opening for directing the pressurized steam to said first end of said water heating chamber, an evaporation chamber for said heating system to generate the pressurized steam and a chamber bottom.

2. Apparatus as defined in claim 1 wherein said pressurization chamber further comprises a lower opening that allows part of the water in said pressurization chamber to be forced into said heating chamber by the differential pressure between said chambers.

3. Apparatus as defined in claim 1 wherein said pressurization chamber further comprises a steam distributor having a distribution chamber for receiving the pressurized steam from said evaporation chamber, a plate member located between said distribution chamber and said first end of said water heating chamber, and a plurality of openings on said plate member for distributing the pressurized steam to the hot water surface in said heating chamber.

4. Apparatus as defined in claim 1 further comprising a heating controller for causing said heating system to heat the water in said heating chamber when the water temperature falls below a first temperature and for preventing said heating system from heating the water in said heating chamber when the water temperature reaches a second temperature, wherein said first and second temperatures are below the boiling temperature for water.

5. Apparatus as defined in claim 4 wherein said heating controller comprises a thermostat located at or near the lowest part of said heating chamber to reduce the difference between said first and second temperatures.

6. Apparatus as defined in claim 1 further comprises a filling valve for said inlet and a reservoir under ambient pressure for providing water to said inlet, said valve having a valve opening and a movable member adapted to open said valve opening after the delivery of a pressurized hot water pulse, thereby allowing water to flow into said heating chamber to render said generator ready for the generation of a next hot water pulse, and to close said valve opening during the delivery of the pressurized hot water pulse.

7. Apparatus as defined in claim 1 further comprising a relief valve having a normally open valve opening to keep said heating chamber open to atmosphere and a valve member adapted to close said valve opening during the delivery of said pressurized hot water pulse and to open said valve opening after said delivery.

8. An apparatus for generating a pressurized hot water pulse and delivering it to a hot water utilization station comprising:
- an inlet for water, said inlet being adapted to be closed during the delivery of the pressurized hot water pulse;
- an outlet having a hot water intake port and a hot water conduit for directing the pressurized hot water pulse to the hot water utilization station;
- a pulse generator connected to said inlet and outlet, said pulse generator comprising a water heating chamber for receiving an amount of water via said inlet and for heating the water therein to produce sufficiently hot water for the hot water utilization station, a pressurization chamber for vaporizing water to generate pressurized steam to deliver under pressure said hot water in said heating chamber as the pressurized hot water pulse to the utilization station through said outlet, and a heating system for the heating and the vaporization of the water in said pulse generator, said heating chamber having a first end adapted to receive pressurized steam and a second end;
- wherein said pressurization chamber provides pressurized steam to said first end of said heating chamber;
- wherein said pulse generator is adapted to allow water to flow into said pressurization chamber from at least one of said water heating chamber and said inlet for the generation of the pressurized steam in said pressurization chamber by said heating system; and
- wherein said pulse generator further comprises a steam distributor located between said pressurization chamber and said first end of said water heating chamber, said distributor having a plate member and a plurality of openings on said plate member for distributing the pressurized steam to the hot water surface in said heating chamber and minimizing the mixing between the pressurized steam and the hot water.

9. An apparatus for generating a pressurized water pulse and delivering it to a water utilization station comprising:
- an inlet for water, said inlet being adapted to be closed during the delivery of the pressurized water pulse;
- an outlet having a water intake port and a water conduit for directing the pressurized water pulse to the water utilization station;
- a pulse generator connected to said inlet and outlet, said generator comprising a water chamber for receiving an amount of water via said inlet, a pressurization chamber for vaporizing water to generate pressurized steam to deliver under pressure the water in said water chamber as the pressurized water pulse to the utilization station through said outlet, and a heating system for the heating and vaporization of water in said pulse generator, said water chamber having a first end adapted to receive pressurized steam and a second end;
- wherein said pressurization chamber provides the pressurized steam to said first end of said water chamber;
- wherein said pulse generator is adapted to allow water to flow into said pressurization chamber from at least one of said water heating chamber and said inlet for the generation of the pressurized steam in said pressurization chamber by said heating system; and
- wherein said pressurization chamber is located in or near said first end of said water chamber and said heating system comprises an electric heater for the heating and evaporation of the water in said pressurization chamber, thereby allowing the pressurized steam to be generated directly at or near said first end of said water chamber.

10. Apparatus as defined in claim 9 wherein said water chamber comprises a water heating chamber, a second heater for heating the water in said water heating chamber, and a heating controller for said second heater for maintaining the water in said water heating chamber sufficiently hot for the water utilization station prior to the delivery of the hot water as a pressurized water pulse to the station.

11. Apparatus as defined in claim 9 wherein said water chamber comprises a tube having a sufficiently small cross-section to allow the water/steam interface therein to adopt substantially the same shape as the cross section of said tube during the delivery of the pressurized water pulse, thereby minimizing the heating of the water in said tube by the pressurized steam.

12. Apparatus as defined in claim 9 further comprises a filling valve for said inlet and a reservoir for providing water to said inlet, said valve having a valve opening and a movable member adapted to open said valve opening after the delivery of a pressurized water pulse, thereby allowing water to flow into said heating chamber to render said generator ready for the generation of a next water pulse, and to close said valve opening during the delivery of the pressurized water pulse.

13. Apparatus as defined in claim 12 further comprising an assistant valve located downstream said water intake port of said outlet for preventing air from entering said water chamber after the delivery of the pressurized water pulse, thereby improving the refilling of said water chamber by water from said inlet.

14. Apparatus as defined in claim 9 further comprising a shield located next to said electric heater for preventing the water from said inlet from substantially cooling said heater after the delivery of a pressurized water pulse until the water sufficiently refills said water chamber, thereby saving energy and reducing the time needed for said electric heater to heat the water in said evaporation chamber to boiling point to generate the pressurized steam for delivering the next pressurized water pulse.

15. Apparatus as defined in claim 9 further comprising one of a water-based decoration station, a cleaning station, a water-driven motion device and a water jet massager as the utilization station.

16. An apparatus for generating a pressurized water pulse and delivering it to a water utilization station comprising:
- an inlet for water, said inlet being adapted to be closed during the delivery of the pressurized water pulse;
- an outlet having a water intake port and a water conduit for directing the pressurized water pulse to the water utilization station;

a pulse generator connected to said inlet and outlet, said generator comprising a water chamber for receiving an amount of water via said inlet, a pressurization chamber for vaporizing water to generate pressurized steam to deliver under pressure the water in said water chamber as the pressurized water pulse to the utilization station through said outlet, and a heating system for the heating and the vaporization of the water in said pulse generator, said water chamber having a first end adapted to receive pressurized steam and a second end;

wherein said pressurization chamber provides the pressurized steam to said first end of said water chamber;

wherein said pulse generator is adapted to allow water to flow into said pressurization chamber from at least one of said water heating chamber and said inlet for the generation of the pressurized steam in said pressurization chamber by said heating system; and a second pulse generator, wherein said outlet of said pulse generator is connected to said second pulse generator to enable a selective delivery of the hot water in either one of or both said generators, thereby providing the user a choice of delivering a small or a large portion of hot water to the water utilization device.

17. Apparatus for preparing a beverage by delivering a hot water pulse to a hot water utilization station comprising:
an inlet adapted to receive water from one of a reservoir and an in-house plumbing system;
an outlet for directing a hot water pulse to the hot water utilization station to provide a beverage;
a pulse generator connected to said inlet and outlet for producing and delivering a hot water pulse, said pulse generator comprising a chamber for receiving an amount of water via said inlet and a heating system for heating water and generating steam pressure to deliver the hot water under pressure through said outlet as a hot water pulse to the utilization station;
a filling valve for said inlet for allowing water to fill said chamber, said filling valve being adapted to move to a first position to allow water to fill said chamber after the delivery of a hot water pulse, thereby rendering said pulse generator ready to generate a next hot water pulse, and to move to a second position to prevent the reverse flow during the delivery of said hot water pulse under pressure;
a heating controller adapted to cause said heating system to heat the water in said chamber when the water temperature falls below a first temperature and to prevent said heating system from further heating the water when the water temperature reaches a second temperature, thereby maintaining said amount of water between said first and second temperatures;
a pressure controller adapted to cause said heating system to produce pressurized steam to deliver hot water in said chamber under pressure as a hot water pulse through said outlet to the hot water utilization station and to prevent said heating system from further heating said pulse generator after the temperature on at least part of said pulse generator reaches a third temperature, said third temperature being substantially above said first and second temperatures; and
wherein said heating system comprises a heating heater for heating said amount of water in said chamber and a delivery heater for generating steam pressure to deliver the resulting hot water in said chamber as a hot water pulse to the hot water utilization station for preparing the beverage, wherein said heating controller is for controlling said heating heater to maintain said hot water between said first and second temperatures and said pressure controller is for controlling said delivery heater to control the delivery of the hot water pulse.

18. Apparatus as defined in claim 17 wherein said heating controller and pressure controller are adapted to allow only one of said heating heater and delivery heater to operate at any time.

19. Apparatus as defined in claim 17 said heating controller comprises a first thermostat for controlling said heating heater to maintain the hot water in said chamber between said first and second temperatures and a second thermostat adapted to disallow said pressure controller to turn on said delivery heater when the water in said chamber is below approximately said first temperature and to allow said pressure controller to turn on said delivery heater when the water in said chamber rises to approximately said first temperature, thereby preventing the delivery of the hot water pulse until the water in said chamber reaches approximately said first temperature.

20. Apparatus as defined in claim 17 wherein said heating controller and pressure controller comprise a switch having a first switch for controlling the electricity to said heating heater and a second switch for controlling said delivery heater, said switch being so constructed that only one of said first and second switches can be at the 'on' or 'close' position at a time.

21. Apparatus as defined in claim 17 wherein said heating controller comprises a thermostat located at or near the lowest part of said heating chamber to reduce the size of difference between said first and second temperatures.

22. Apparatus as defined in claim 17 wherein said first and second temperatures are between 170° F. to 210° F., which are substantially below the water boiling point.

23. Apparatus as defined in claim 17 wherein said pressure controller turns off said delivery heater substantially before the end of the pressurized water pulse to prevent the generation of steam pressure when water refills said heating chamber, thereby enabling said pulse generator to meter one pressurized water pulse to the utilization station.

24. Apparatus as defined in claim 17 further comprising a relief valve having a normally open valve opening to keep said heating chamber open to atmosphere and a valve member adapted to close said valve opening during the delivery of said pressurized hot water pulse and to open said valve opening after said delivery.

25. Apparatus as defined in claim 17 further comprising a sufficiently horizontal and thin chamber or channel located between said filling valve and said reservoir for preventing the temperature increase of the water in said reservoir during the period of maintaining the water in said heating chamber between said first and second temperatures, thereby saving energy.

26. Apparatus for preparing a beverage by delivering a hot water pulse to a hot water utilization station comprising:
an inlet adapted to receive water from one of a reservoir and an in-house plumbing system;
an outlet for directing a hot water pulse to the hot water utilization station to provide a beverage;
a pulse generator connected to said inlet and outlet for producing and delivering a hot water pulse, said pulse generator comprising a chamber for receiving an amount of water via said inlet and a heating system for heating water and generating steam pressure to deliver the hot water under pressure through said outlet as a hot water pulse to the utilization station;

a filling valve for said inlet for allowing water to fill said chamber, said filling valve being adapted to move to a first position to allow water to fill said chamber after the delivery of a hot water pulse, thereby rendering said pulse generator ready to generate a next hot water pulse, and to move to a second position to prevent the reverse flow during the delivery of said hot water pulse under pressure;

a heating controller adapted to cause said heating system to heat the water in said chamber when the water temperature falls below a first temperature and to prevent said heating system from further heating the water when the water temperature reaches a second temperature, thereby maintaining said amount of water between said first and second temperatures;

a pressure controller adapted to cause said heating system to produce pressurized steam to deliver hot water in said chamber under pressure as a hot water pulse through said outlet to the hot water utilization station and to prevent said heating system from further heating said pulse generator when the temperature on at least part of said pulse generator reaches a third temperature, said third temperature being substantially above said first and second temperatures; and wherein said pressure controller comprises a thermostat having an activation beam, said thermostat being adapted to move automatically from its 'on' position to its 'off' position when the chamber temperature reaches said third temperature to cause said heating system to stop supplying heat to said pressurization chamber, but to move from said 'off' position to said 'on' position only after said activation beam is pressed or turned.

27. Apparatus as defined in claim 26 wherein said pressure controller further comprises an electrical switch coupled to said activation beam in such a way that the action of turning on said switch will cause said thermostat to move to its 'on' position.

28. Apparatus for preparing a beverage by delivering a hot water pulse to a hot water utilization station comprising:
    an inlet for receiving water;
    an outlet for directing a hot water pulse to the hot water utilization station to provide a beverage;
    a pulse generator connected to said inlet and outlet for producing and delivering the hot water pulse, said pulse generator comprising a chamber for receiving an amount of water via said inlet and a heating system for heating water and generating steam pressure to deliver the hot water under pressure through said outlet as a hot water pulse to the utilization station;
    a heating controller adapted to cause said heating system to heat the water in said chamber when the water temperature falls below a first temperature and to prevent said heating system from further heating the water when the water temperature reaches a second temperature, thereby maintaining said amount of water between said first and second temperatures;
    a pressure controller adapted to cause said heating system to produce pressurized steam to deliver hot water in said chamber under pressure as a hot water pulse through said outlet to the hot water utilization station and to prevent said heating system from further heating said pulse generator when the temperature on at least part of said pulse generator reaches a third temperature, said third temperature being substantially above said first and second temperatures; and
    wherein said heating system comprises an electric heater located in or near the top part of said chamber to allow said electric heater to generate steam directly at or near said top part of said chamber to build said steam pressure above the hot water in said chamber, thereby substantially preventing said heater and the steam from heating said hot water during the delivery of the hot water pulse through said outlet to the container.

29. Apparatus as defined in claim 28 wherein said heating system further comprises a second heater located in the lower part of said chamber and controlled by said heating controller to keep said hot water in said chamber between said first and second temperatures.

30. Apparatus as defined in claim 28 further comprising a filling valve for said inlet and an ambient pressure reservoir connected to said inlet, said valve having a seal member adapted to move to a first position to allow water to fill said chamber after the delivery of a hot water pulse and to a second position to prevent the reverse flow during the delivery of said hot water pulse under pressure.

31. Apparatus for preparing a beverage such as coffee or tea with a hot water pulse comprising:
    an inlet adapted to receive water from one of a reservoir and an in-house plumb system;
    an outlet for directing a hot water pulse into a container containing a supply of flavor-containing materials adapted to provide a drink when interacted with hot water;
    a chamber for receiving an predetermined amount of water via said inlet;
    an electric heater for heating said predetermined amount of water in said chamber;
    a heater controller having a temperature sensing member in heat-conducting relation to said electric heater to sense the temperature of said heater, said controller being adapted to cause said electric heater to heat the water in said chamber when the sensed heater temperature is below a first temperature and to prevent said heater from heating the water when the sensed temperature reaches a second temperature, thereby maintaining the hot water in said chamber approximately between said first and second temperatures for a period of time prior to the delivery of a hot water pulse;
    a delivery system for delivering at least part of the hot water in said chamber as a hot water pulse through said outlet to the container, wherein the hot water interacting with the supply of flavor-containing materials to provide a drink; and
    a Delta temperature narrower having a first end in heat-conducting relation to said temperature sensing member and a second end extended to one of an air space and an object that are substantially cooler than said heater during said period of time prior to the delivery of the hot water pulse, said Delta temperature narrower being adapted to conduct heat away from said temperature sensing member at said first end to said one of an air space and an object at said second end at a such rate that the difference between said first and second temperature is substantially reduced, thereby substantially reducing the temperature variation of the hot water in said chamber prior to the delivery of a hot water pulse to the container by said delivery system.

32. Apparatus for generating a pressurized water pulse and delivering it to a water utilization station comprising:
    an inlet adapted to receive water from a water reservoir;
    a filling valve for said inlet;
    an outlet for directing a pressurized water pulse to the water utilization station;

a pulse generator connected to said inlet and outlet, said pulse generator comprising a water chamber for receiving an amount of water from the reservoir via said inlet, a pressurization chamber for heating and vaporizing water to generate pressurized pressure for delivering the water in said water chamber as a pressurized water pulse through said outlet to the utilization station, and a heating system for the heating and vaporization of water in said pulse generator, said water chamber having a first end adapted to receive the pressurized steam from said pressurization chamber and a second end;

wherein said filling valve is adapted to open to allow water to enter said pulse generator after delivery of a pressurized water pulse and to prevent the reverse flow during the delivery of the pressurized water pulse to the water utilization station;

wherein said generator is adapted to allow said pressurization chamber to provide pressurized steam to said first end of said water chamber substantially;

wherein said pressurization chamber is adapted to receive water from at least one of said water chamber and said inlet;

wherein said pressurization chamber comprises an evaporation chamber to which said heating system supplies heat to generate pressurized steam therein and a chamber opening to direct the pressurized steam in said evaporation chamber to said first end of said water chamber; and wherein said pulse generator further comprises a steam distributor located between said pressurization chamber and said first end of said water chamber, said distributor having a plate member and a plurality of openings on said plate member for distributing the pressurized steam from said evaporation chamber to said first end of said water chamber.

33. Apparatus for generating a pressurized water pulse and delivering it to a water utilization station comprising:
an inlet adapted to receive water from a water reservoir;
a filling valve for said inlet;
an outlet for directing a pressurized water pulse to the water utilization station;
a pulse generator connected to said inlet and outlet, said pulse generator comprising a water chamber for receiving an amount of water from the reservoir via said inlet, a pressurization chamber for heating and vaporizing water to generate pressurized pressure for delivering the water in said water chamber as a pressurized water pulse through said outlet to the utilization station, and a heating system for the heating and vaporization of water in said pulse generator, said water chamber having a first end adapted to receive the pressurized steam from said pressurization chamber and a second end;
wherein said filling valve is adapted to open to allow water to enter said pulse generator after delivery of a pressurized water pulse and to prevent the reverse flow during the delivery of the pressurized water pulse to the water utilization station;
wherein said generator is adapted to allow said pressurization chamber to provide the pressurized steam to said first end of said water chamber;
wherein said pressurization chamber is adapted to receive water from at least one of said water chamber and said inlet;
wherein said pressurization chamber is located near said first end of said water chamber; and wherein said water chamber comprises an elongated chamber adapted to keep the interface between the water and pressurized steam in said tube substantially intact during the delivery of a pressurized water pulse, thereby minimizing the heating of the water in said tube by the pressurized steam.

34. Apparatus as defined in claim 33 wherein said elongated chamber comprises a tube having at least one of a bent section and a horizontal section.

35. Apparatus for generating a pressurized water pulse and delivering it to a water utilization station comprising:
an inlet adapted to receive water from a water reservoir;
a filling valve for said inlet;
an outlet for directing a pressurized water pulse to the water utilization station;
a pulse generator connected to said inlet and outlet, said pulse generator comprising a water chamber for receiving an amount of water from the reservoir via said inlet, a pressurization chamber for heating and vaporizing water to generate pressurized pressure for delivering the water in said water chamber as a pressurized water pulse through said outlet to the utilization station, and a heating system for the heating and vaporization of water in said pulse generator, said water chamber having a first end adapted to receive the pressurized steam from said pressurization chamber and a second end;
wherein said filling valve is adapted to open to allow water to enter said pulse generator after delivery of a pressurized water pulse and to prevent the reverse flow during the delivery of the pressurized water pulse to the water utilization station;
wherein said generator is adapted to allow said pressurization chamber to provide the pressurized steam to said first end of said water chamber;
wherein said pressurization chamber is adapted to receive water from at least one of said water chamber and said inlet; and
wherein said water chamber comprises a plurality of slim chambers, each of which has a top opening in communication with said inlet and a bottom opening in communication with said outlet, for reducing convective flow of the water, thereby preventing or reducing the heating of the water by the pressurized steam in said water chamber.

36. Apparatus for providing both an under-sized hot water pulse and full-sized hot water pulse comprising:
an inlet for receiving water from a reservoir;
a pulse generator connected to said inlet for producing and delivering a hot water pulse, said pulse generator comprising a chamber for receiving via said inlet an amount of water from the reservoir, a heating system adapted to heat said amount of water in said chamber and adapted to generate pressurized steam for delivering the hot water as a hot water pulse, and a controller adapted to cause said heating system to generate said pressurized steam;
a filling valve for said inlet for allowing water to fill said pulse generator, said filling valve being adapted to open to allow water to enter said chamber when the pressure therein falls below a predetermined pressure after the delivery of a hot water pulse and to prevent the reverse flow during the delivery of said hot water pulse under pressure;
an outlet having a first hot water intake port located at a first predetermined distance above the bottom of said chamber, a second hot water intake port located at a second predetermined distance above the bottom of said chamber, and a selection valve for a user to connect one of said first and second intake ports to a hot water utilization station, said second predetermined distance being substantially larger than said first predetermined distance; and whereby in operation, when a user moves said selection valve to connect said first hot water intake port to the utilization station, the hot water between said filling valve and said first intake port in said chamber will be delivered as an undersized hot water pulse to the utilization station, and when a user moves said selection valve to connect said second intake port to the utilization station, the hot water between said filling valve and said second intake port in said chamber will be delivered as a full-sized hot water pulse to the utilization station.

37. An apparatus as defined in claim 36 wherein said pulse generator is adapted to prevent the residual heat after the delivery of one of said undersized and full-sized hot water pulses from generating any significant steam pressure when said chamber is refilled with water from the reservoir, thereby preventing the delivery of any un-wanted premature or baby water pulse to the utilization station.

38. Apparatus for generating steam and delivering it to a steam utilization station comprising:

an inlet for water;

a generator connected to said inlet for producing and delivering steam, said generator comprising a water chamber for receiving an amount of water via said inlet and a pressurization chamber for receiving heat from a heating system to heat and vaporize the water in said pressurization chamber to generate steam and for allowing the delivery of the steam to the steam utilization station;

wherein said pressurization chamber is adapted to contain a substantially smaller amount of water than said generator to reduce the amount of time needed to heat the water in said pressurization chamber to the boiling point to generate steam, thereby enabling fast generation and delivery of steam to the steam utilization station;

wherein said water chamber and pressurization chamber are adapted to allow the water in said water chamber to flow and feed into said pressurization chamber; and wherein said generator further comprises a partition between said pressurization chamber and water chamber to prevent the steam and hot water in said pressurization chamber from mixing with the water in said water chamber.

39. Apparatus as defined in claim 38 further comprising a chamber opening located in or near the lower part of said water chamber for allowing water to flow into said pressurization chamber as the water therein is vaporized into the steam and delivered to the steam utilization station.

40. Apparatus as defined in claim 39 wherein said chamber opening is sufficiently large to enable the water in said water chamber to flow into said pressurization chamber sufficiently fast during the refilling of said water chamber via said inlet to cause a thermal shock for efficient removal of the scale formed in said pressurization chamber.

41. Apparatus as defined in claim 39 further comprising a second opening on said pressurization chamber for introducing steam to the top end of said water chamber during the generation of the steam in said pressurization chamber, thereby facilitating the water flow from said water chamber to said pressurization chamber.

42. Apparatus as defined in claim 38 wherein said inlet functions also as an outlet for the steam generated in said pressurization chamber.

43. Apparatus as defined in claim 42 wherein said inlet is outwardly tapered to have a larger top end to enable the steam speed to slow down as the steam flows out of said inlet toward said larger top end to contact a person or object.

44. Apparatus as defined in claim 38 further comprising a filling valve for said inlet and an ambient pressure reservoir connected to said inlet, said valve having a seal member adapted to move to a first position to allow water to flow into said water chamber after the delivery of the steam and to a second position to prevent the reverse flow during the delivery of said the steam to the utilization station.

45. Apparatus for generating steam and delivering it to a steam utilization station comprising:

an inlet for water;

a generator connected to said inlet for producing and delivering steam, said generator comprising a water chamber for receiving an amount of water via said inlet and a pressurization chamber for receiving heat from a heating system to heat and vaporize the water in said pressurization chamber to generate steam and for allowing the delivery of the steam to the steam utilization station;

wherein said pressurization chamber is adapted to contain a substantially smaller amount of water than said generator to reduce the amount of time needed to heat the water in said pressurization chamber to the boiling point to generate steam, thereby enabling fast generation and delivery of steam to the steam utilization station; and wherein said water chamber and pressurization chamber are adapted to allow the water in said water chamber to flow and feed into said pressurization chamber; and wherein said generator further comprises a cover for the water in said water chamber, said cover being adapted to move up as the water chamber is being filled and move down as the water is evaporated in said pressurization chamber.

46. Apparatus as defined in claim 45 wherein said cover comprises a layer of liquid having lower density and substantially higher boiling point than water.

47. Apparatus for providing at least two different sizes of liquid pulse to a utilization station comprising:

an inlet for receiving liquid from a liquid supply;

a pulse generator connected to said inlet for producing a liquid pulse, said pulse generator comprising a chamber for receiving liquid via said inlet and a pressurization system for the building up of a pressurized gas above the liquid surface in said chamber to deliver a predetermined amount of liquid out of said chamber as said liquid pulse;

an outlet having a liquid intake port adapted to locate at a plurality of positions above the bottom end of said chamber of said pulse generator and a conduit connected to the utilization station; and a volume selection valve for a user to select a position for said liquid intake port, whereby in operation the activation of said pulse generator causes the building up of a pressurized gas above the liquid in said chamber to pressurize said liquid and deliver the amount of liquid located above said liquid intake port in said chamber out of said outlet as said liquid pulse to the utilization station.

48. An apparatus as defined in claim 47 further comprising an reservoir and an inlet valve for said inlet for allowing liquid from said reservoir to fill said chamber, said inlet valve having an valve opening and a valve seal member adapted to open said valve opening to allow liquid to enter said chamber after the delivery of a liquid pulse and to prevent the reverse flow during the delivery of said liquid pulse by the pressurized gas.

49. An apparatus as defined in claim 47 wherein said pulse generator further comprises a heating system having a heater for heating water to generate pressurized steam as said pressurized gas to deliver the amount of liquid above said liquid intake port in said chamber to the utilization station.

50. An apparatus as defined in claim 49 wherein said pulse generator further comprises a heating controller for controlling said heating system to maintain the liquid in said chamber between a first temperature and a second temperature and a pressure controller for controlling said heater to control the generation of said pressurized steam for delivering the liquid pulse.

51. An apparatus for generating a pressurized liquid pulse and delivering it to a liquid utilization station comprising:
- a reservoir for providing a supply of liquid;
- an inlet connected to said reservoir;
- a pulse generator comprising a liquid chamber for receiving an amount of liquid from said reservoir via said inlet, a pressurization chamber for generating pressurized steam to deliver the liquid in said liquid chamber as a pressurized liquid pulse to the utilization station, and a heating system for providing heat to said pressurization chamber to generate pressurized steam;
- an outlet having a liquid intake port in said liquid chamber and a conduit for directing the pressurized liquid pulse to the utilization station;
- an inlet valve for said inlet for allowing the liquid from said reservoir to fill said liquid chamber, said inlet valve having an valve opening and a valve seal member adapted to open said valve opening to allow liquid to enter said liquid chamber after the delivery of a pressurized liquid pulse to the utilization station and to prevent the reverse flow during the delivery of the liquid pulse;
- at least one partition for separating said pressurization chamber from said liquid chamber to substantially prevent the pressurized steam generated in said pressurization chamber from mixing with or heating the liquid in said liquid chamber during the delivery of the pressurized liquid pulse;
- wherein said liquid chamber having a first end adapted to receive the pressurized steam from said pressurization chamber and a second end, said liquid in said liquid chamber being at a temperature below the boiling point of the liquid; and
- wherein said pressurization chamber comprises an evaporation chamber in which said heating system generates said pressurized steam, a chamber bottom, and a steam outlet for directing the pressurized steam to said first end of said liquid chamber to pressurize and deliver the liquid in said liquid chamber as the pressurized liquid pulse to the utilization station.

52. Apparatus as defined in claim 51 further comprising a supply of liquid for said pulse generator, said liquid having substantially lower vapor pressure than water.

53. Apparatus as defined in claim 51 further comprising a supply of liquid, said liquid being substantially insoluble in water.

54. Apparatus as defined in claim 51 further comprising an opening between said liquid chamber and pressurization chamber to allow the liquid in said liquid chamber to flow into said pressurization chamber after the delivery of the liquid in said liquid chamber by the pressurized steam.

55. Apparatus as defined in claim 51 further comprising a steam director located at said first end of said liquid chamber for minimizing the interaction of said pressurized steam with the liquid in said liquid chamber when the pressurized steam is introduced to said liquid chamber from said pressurization chamber.

56. Apparatus as defined in claim 55 wherein said steam director comprises a distribution chamber, a plate for said distribution chamber and a plurality of openings on said plate for distributing the pressurized steam to the liquid in said liquid chamber.

\* \* \* \* \*